United States Patent [19]

Johnson et al.

[11] 4,262,408

[45] Apr. 21, 1981

[54] ASSEMBLING HOSE UNITS FOR APPLIANCES

[75] Inventors: Ernest D. Johnson, Wildwood, Ill.; David L. Braun, North Canton, Ohio

[73] Assignee: The Goodyear Tire & Rubber Company, Akron, Ohio

[21] Appl. No.: 52,651

[22] Filed: Jun. 27, 1979

[51] Int. Cl.³ .................. B21D 19/00; B23P 21/00
[52] U.S. Cl. .................... 29/507; 29/783; 29/785; 29/788; 29/33 K; 29/33 T
[58] Field of Search ............... 29/771, 785, 788, 523, 29/237, 507, 783, 791, 792, 796, 505, 711, 712, 715, 33 K, 33 T

[56] References Cited

U.S. PATENT DOCUMENTS

| 1,252,677 | 1/1918 | Faidley, Jr. et al. ............... 29/33 K |
| 2,735,473 | 2/1956 | Diget et al. ............................ 29/523 |
| 3,037,268 | 6/1962 | Mitchell, Jr. et al. ............ 29/788 X |
| 3,874,048 | 4/1975 | Millar et al. ...................... 29/715 X |

Primary Examiner—Ervin M. Combs
Assistant Examiner—C. J. Arbes

Attorney, Agent, or Firm—T. P. Lewandowski

[57] ABSTRACT

Method and apparatus for assembling a hose unit consisting of a given length of hose having end couplings inserted respectively in each of its ends. The given length is measured and cut off, being inserted freely, longitudinally in a rigid tube without endwise restraint. The couplings are inserted simultaneously, the thrust applied being balanced as well as sufficient to compress the hose longitudinally, while the dimensions of the tube relative to the hose are such as to prevent buckling. The rigid tube moves perpendicularly of the length of hose, preferably about a common axis, stepwise to a series of stations. In one station the inserted couplings are secured to the respective ends by a commercial crimper-expander. The hose unit is then dropped or ejected to a container. The foregoing abstract is not to be taken as limiting the invention of this application, and in order to understand the full nature and extent of the technical disclosure of this application, reference must be made to the accompanying drawing and the following detailed description.

30 Claims, 17 Drawing Figures

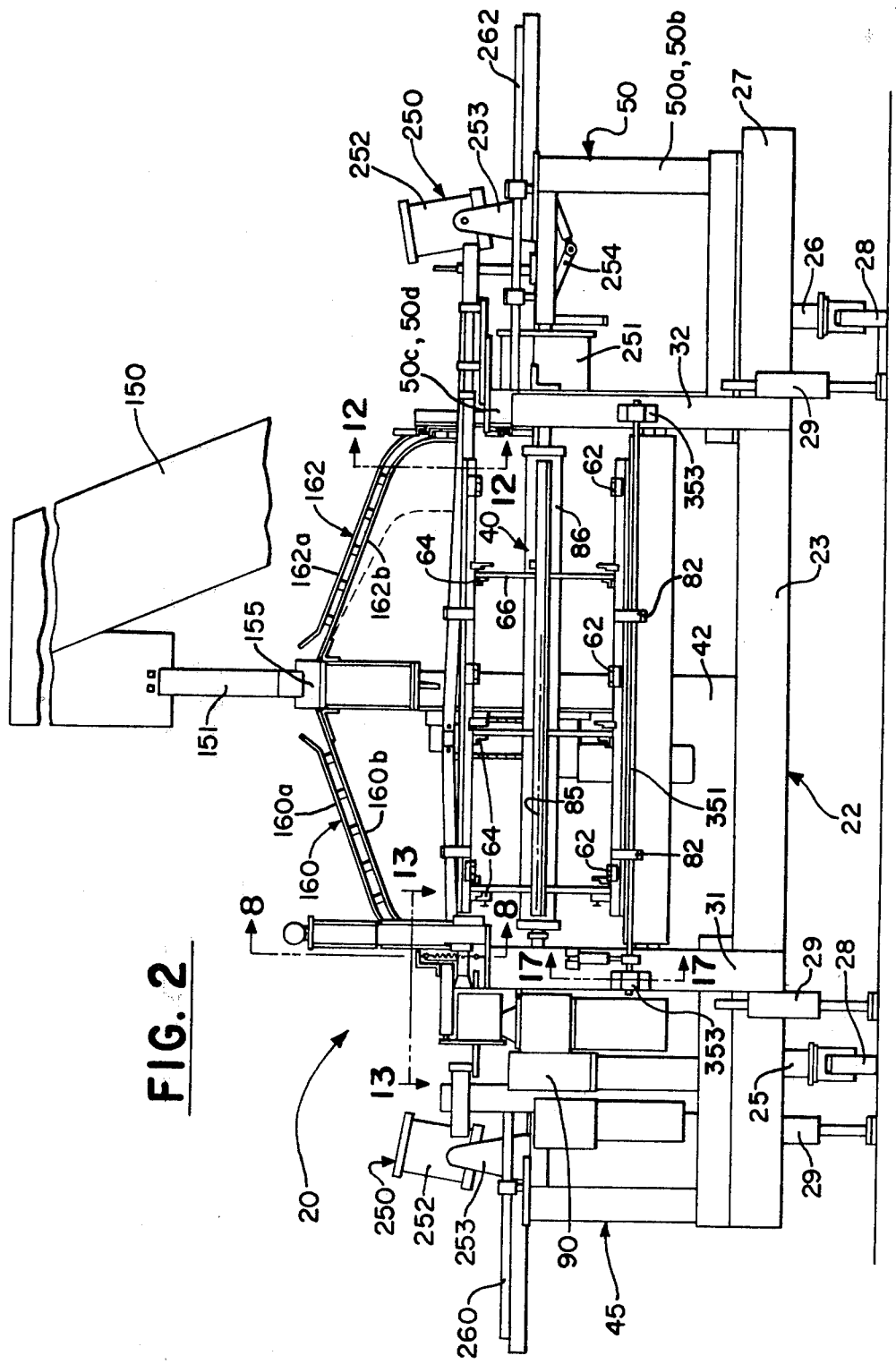

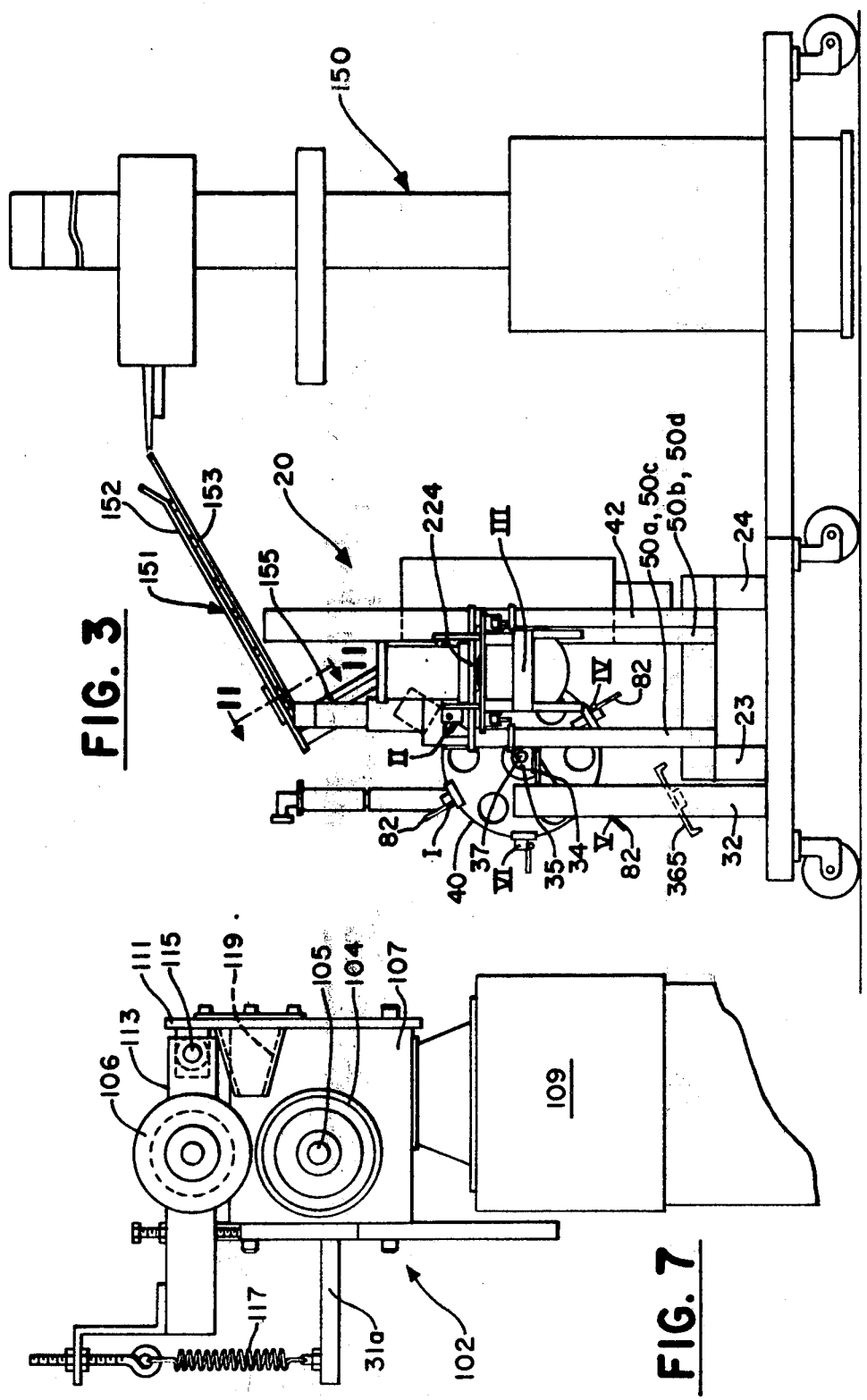

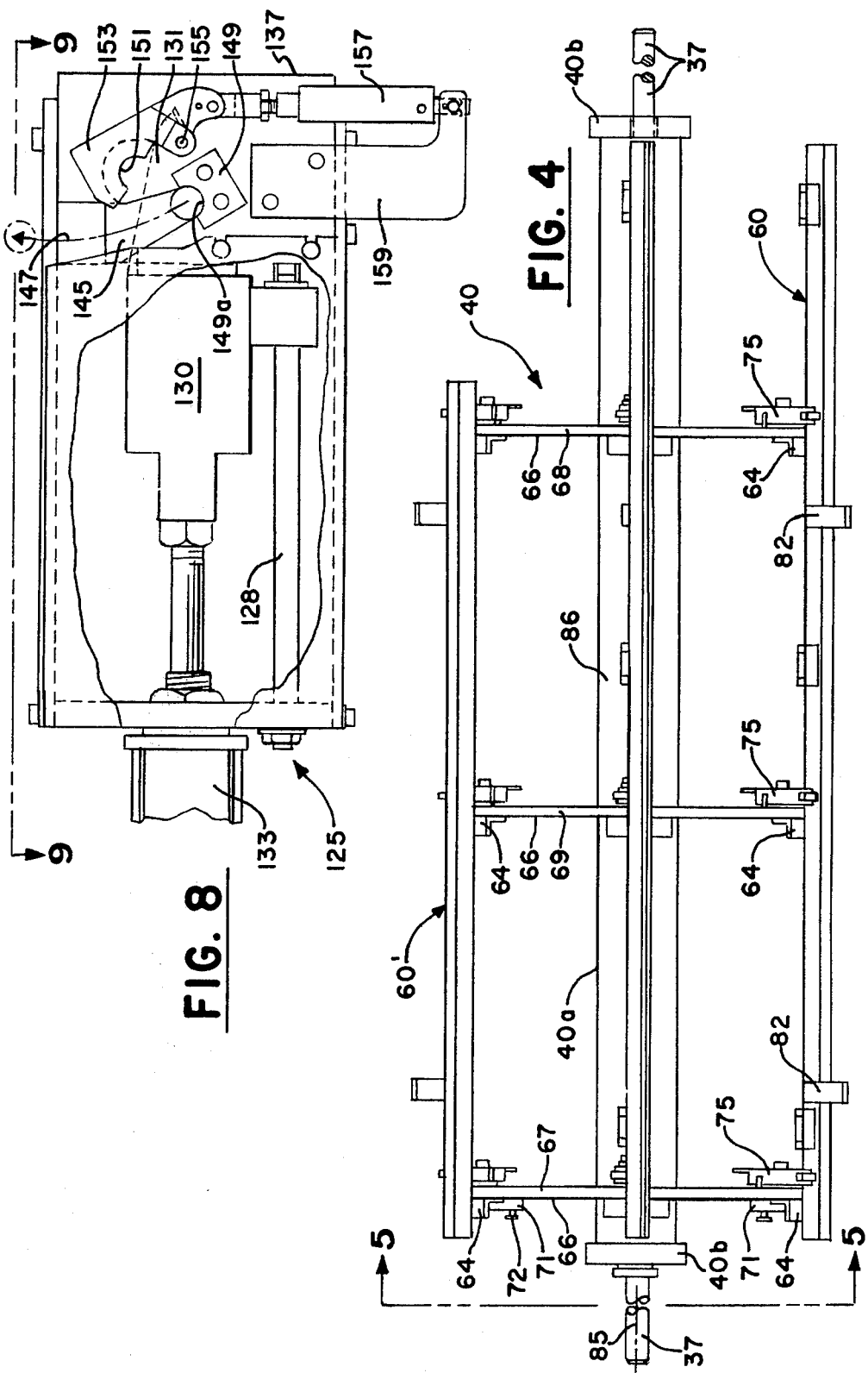

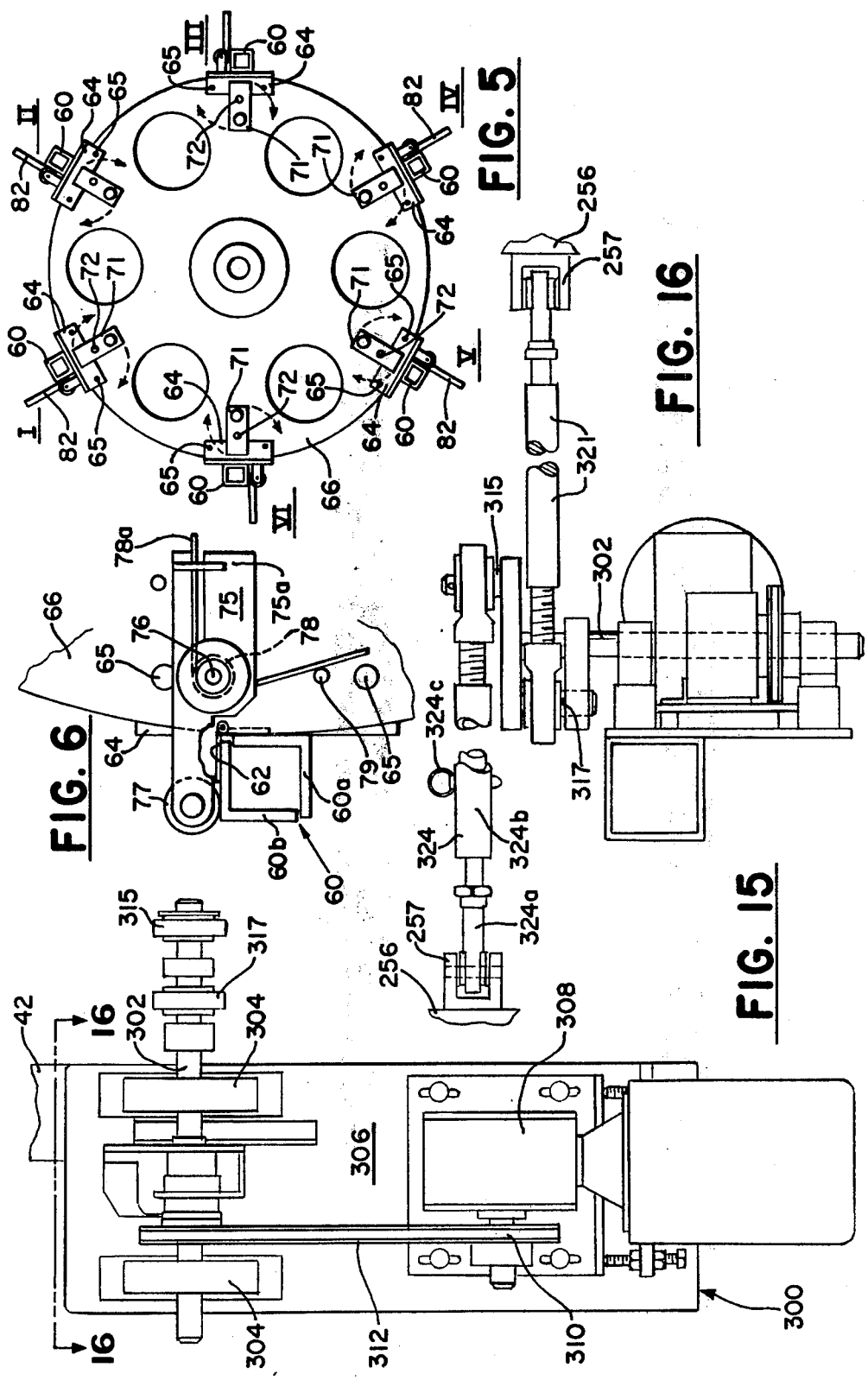

ASSEMBLING HOSE UNITS FOR APPLIANCES

The present invention relates to the assembly of hose units each consisting of a given length of hose and a pair of conventional hose end couplings and particularly relates to the fabrication or assembly of hose units such as those useful with appliances such as domestic washing machines or dishwashers.

A principal object of the invention is to provide for the fabrication of hose units or assemblies with less manual effort and time expended thereby to reduce the cost of such hose units relative to the manual and semi-automatic methods and apparatus of prior practice.

A further object is the provision of a method and apparatus for carrying out the method wherein the individual operations of assembling a hose unit are carried out simultaneously thereby reducing storage and handling of in-process inventory.

Another object of the invention is the provision of a method and apparatus wherein assemblies of hose units are continuously fabricated from a bulk-running supply of hose and a continuing stream or queue of conventional hose end couplings.

Briefly, broadly, one aspect of the invention comprises a method of assembling a hose unit composed of a given length of hose and a pair of hose couplings one at each end of the length of hose, the method comprising measuring and cutting off said given length from a supply of hose, placing said given length of hose in a rigid tube of a length only slightly less than said given length and of transverse inside dimensions at least sufficiently greater than the transverse outside dimensions of the hose to permit the hose to move freely longitudinally of said tube, and simultaneously inserting said couplings one into each end of the given length of hose while the latter occupies said rigid tube.

Briefly, broadly, another aspect of the invention comprises an apparatus for assembling a hose unit composed of a given length of hose and a pair of hose end couplings one at each end of the length of hose, the apparatus comprising holding means for supporting said given length of hose without longitudinal restraint thereon, moving means for moving said holding means stepwise to a plurality of successive stations, infeed means for feeding said given length of hose longitudinally into said holding means, a pair of inserter means cooperable simultaneously to insert a hose end coupling in each end of said given length of hose in said holding means, and support means including a frame constructed and arranged to support in cooperable relation said holding means, said moving means, said infeed means, and said pair of inserter means.

In a further aspect, the invention comprises providing in such holding means tube means providing a pair of tube-wall members separable to release said hose unit in a direction normal to said given length, said tube means having transverse dimensions sufficiently greater than the corresponding transverse dimensions of said hose to permit said given length to be inserted freely longitudinally in the tube means but not greater than the corresponding transverse dimensions of said hose required to minimize transverse bending of said hose when said couplings are being inserted therein.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

In the drawings:

FIGS. 1, 2, and 3 illustrate respectively a plan view, a front elevation view, and an end elevation view of an apparatus according to the invention;

FIG. 4 is an expanded front elevation of parts of the apparatus of FIGS. 1, 2, and 3;

FIG. 5 is an expanded end view taken at the line 5—5 of FIG. 4;

FIG. 6 is an enlarged detail view of a part of FIG. 5;

FIG. 7 is an enlarged view of a part of the apparatus as seen at the line 7—7 in FIG. 1;

FIG. 8 is a view of a component of the apparatus of FIGS. 1, 2, and 3, as seen at the line 8—8 of FIG. 2;

FIG. 15 is an elevation view taken on the line 15—15 of FIG. 1 of a part of the apparatus;

Figure 1:
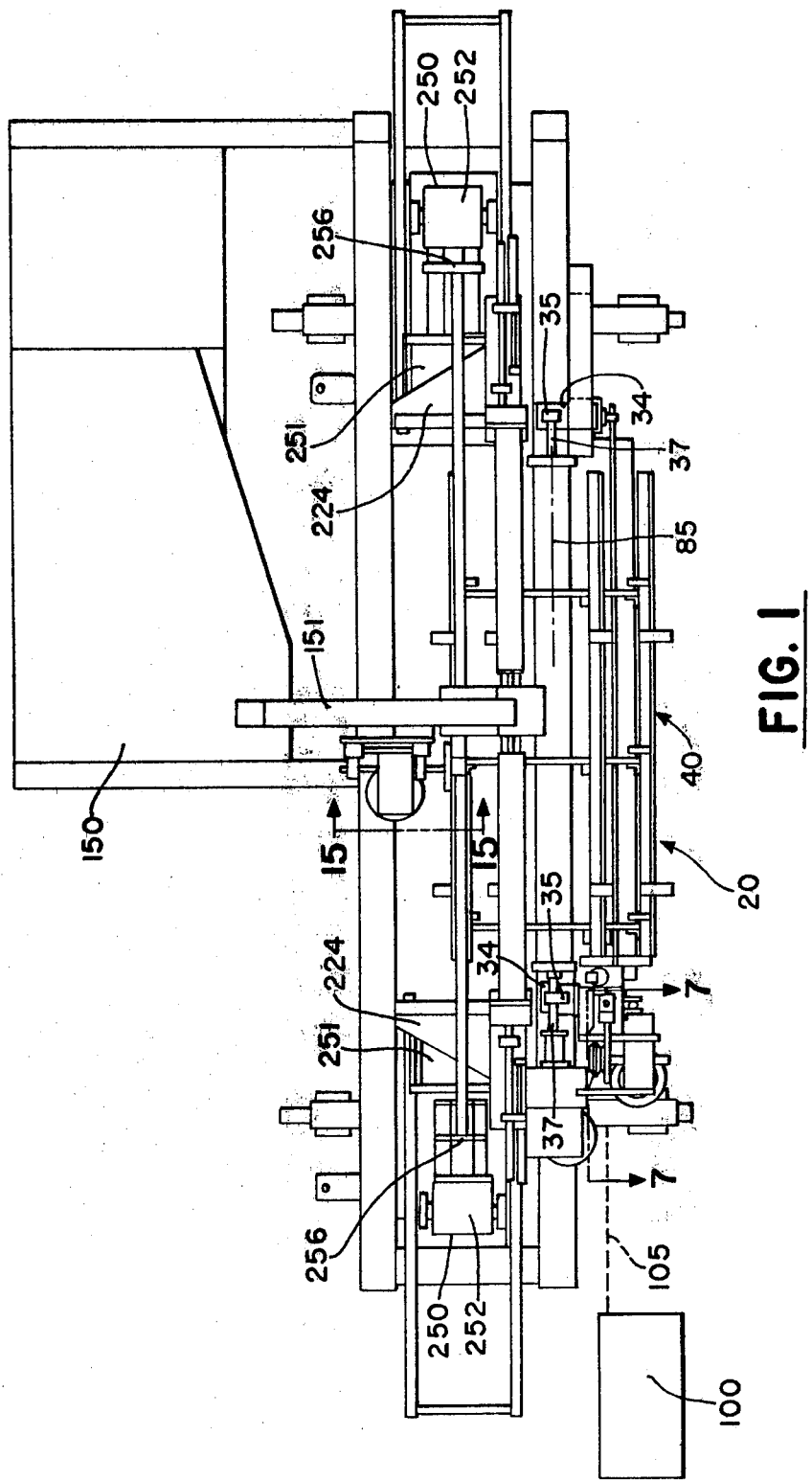

FIG. 16 is a view of the part shown in FIG. 15 as seen on line 16—16 therein; and FIG. 17 is an end view of a part of the apparatus of FIGS. 1, 2, and 3 taken as seen at the line 17—17 of FIG. 2.

Making reference to the drawings and particularly to FIGS. 1, 2, and 3, an apparatus 20 in accordance with the invention includes a frame 22 providing a rigid support means. The frame comprises a pair of main beams 23,24 disposed in spaced parallel arrangement on a parallel pair of crossbeams 25,26 so as to form a rigid rectangular, generally horizontal base 27 which can optionally be provided with wheels 28 to enhance the mobility of the apparatus and with retractible jacks 29 effective to immobilize the apparatus in a chosen location. The frame 22 includes a pair of vertical posts 31,32 suitably spaced apart on the forward main beam 23, each having a bracket 34 which supports a pillow block bearing 35 which bearings cooperate to support rotatably the center shaft journals 37 of a rotor 40 later to be described. A center post 42 is erected vertically on the rearward main beam 24 at a position intermediate the left and right vertical posts, as seen in FIG. 2.

A left upper frame part 45 is mounted, preferably fixed, on the base and comprises a plurality of vertical posts constructed and arranged rigidly to support components of the apparatus presently to be described in further detail.

The right upper frame part 50 forms a unitary rigid support and is mounted so as to be positionable adjustably toward the right or toward the left on the base 27 as seen in FIGS. 1 and 2, and comprises a plurality of vertical posts 50a, 50b, 50c and 50d, adapted to support components of the apparatus presently to be described. The right upper frame part 50 can be adjusted toward and away from the left upper frame part 45 for purposes which presently will be made more clear.

The frame as generally described can have any suitable form which provides for the rigid location of the components of the apparatus with respect to the rotor and particularly with respect to holding means presently to be discussed in further detail.

Referring additionally to FIGS. 4, 5, and 6, in accordance with the invention, to support a given length of hose freely and without longitudinal restraint, the apparatus includes holding means each provided by a rigid tube 60 of an appropriate length. It is contemplated within the scope of the invention that the rigid tubes can be smoothly curved as in the form of U-tube bends but it is considered preferable that the tubes be straight over their entire length. Each of the rigid tubes 60 in the apparatus has an overall length which is slightly, that is, from 2 to about 10 inches, less in length than the given length of the hose units to be assembled. The transverse inside dimensions of the rigid tube are at least sufficiently greater than the transverse outside dimensions of the hose to be assembled in the apparatus so as to permit the hose to be moved freely longitudinally of the tube, but not greater than the transverse dimensions required to minimize transverse bending of the hose in a manner corresponding to buckling in a column. Thus the hose, while occupying the rigid tube, even though not itself restrained from being displaced by the insertion of the coupling, is sufficiently retained in the holding means to provide very satisfactory support for the insertion of a hose end coupling simultaneously into each of its ends without being adversely displaced.

Each rigid tube 60, there being six in the present apparatus, is secured to and readily removed manually from the rotor 40 and is constructed of a pair of tube-wall members 60a,60b. The members 60a,60b are conveniently formed of structural angle disposed to form a square tube as seen in FIGS. 5 and 6. The two wall members are joined by a plurality of butt hinges 62, the respective leaves of which are suitably joined to the angles by welding or the like so that one member 60b can swing away from the other 60a to open the full length of the tube. The tube-wall member 60a has a plurality of spaced angle brackets secured thereon by which it is affixed to the rotor 40. Each angle bracket is drilled to receive a pair of mounting pins 65. The angle brackets are spaced longitudinally of the rigid tube 60 and are oriented to engage the corresponding faces 66 of the discs 67,68,69 which form a part of the rotor, so as to be removable by a small movement toward the left as seen in FIG. 4 to disengage the angle brackets 64 from the respective pins 65 and allow readily the manual removal of the respective rigid tubes 60. The arrangement enables each rigid tube to be retained on the rotor by employing a swivel clamp 71 alternately positionable as seen in FIG. 5 or swivelled about a shoulder bolt 72 to release the angle brackets for removal of the tube 60.

To maintain each rigid tube closed, the spring-biased levers 75 are pivotally mounted each by a shoulder bolt 76 on each rotor disc adjacent each tube. At least two levers are associated with each tube. Each lever has a roller 77 disposed to engage the hinge-mounted tube-wall member 60b. The bias is provided by a torsion spring 78 having one leg 78a engaged in the rearward extension 75a of the lever as seen in FIG. 6 and the other leg 78b retained by a pin 79 fixed in the associated disc of the rotor.

A pair of trip tabs 82 are affixed to the hinged wall member 60b at suitable locations therealong to cooperate with ejector means presently to be discussed.

One of the features of the present apparatus is the accommodation therein of hose units of differing given lengths. FIG. 4 illustrates by way of example, a short rigid tube 60' and a long rigid tube 60. It will be appreciated that any one length of tube is selected for all of the positions on the rotor 40 for operation of the apparatus to assemble a particular given length of hose unit, and each of the six holding tubes will be of the same length.

To move the rigid tubes 60 stepwise from station to station, in directions perpendicular to their lengths, or about a common axis, the apparatus includes the rotor 40 which is mounted on a hollow center shaft 40a provided with suitable hubs 40b,40c each of which contains a journal 37 which journals are respectively supported in the previously mentioned pillow block bearings 35 for rotation about the common axis 85 to which each of the rigid tubes is parallel.

The discs to which the rigid tubes are secured as has been described are secured coaxially to the hollow center shaft 86 by welding or otherwise. The first disc 67, leftmost in the figure, is positioned adjacent the hub 40b. The second or rightmost disc 68 is positioned along the hollow center shaft adjacent and inward of the end of the shortest rigid tube 60' intended for use in the particular apparatus 20 and a third disc 69 is positioned intermediate the first and second discs along the hollow center shaft.

To move the respective rigid tubes stepwise to occupy successively several stations, the apparatus 20 includes indexing drive means 90 of the Geneva type which is mounted on the left upper frame part and is coupled to the journal 37 of the rotor. A suitable Geneva type drive is available commercially from the Ferguson Machine Company of St Louis, Mo. under their trademark Paradex. The rotor thus provides means for moving the holding means in directions normal to their own length and particularly stepwise to a plurality of successive stations. As may be observed in the figure, the present apparatus has six stations, designated I–VI.

To feed hose from the supply means 100 into a tube on the rotor while the tube occupies station I as seen in FIG. 3, an infeed device 102 is mounted on the post 31 and provides an opposed pair of grooved feed rollers 104,106 best seen in FIG. 7, which operate to draw the hose from a bulk, running length supply and to push a leading end of the hose longitudinally into a tube.

The leading end of the hose is inserted into a tube 60 and through sufficiently to locate its leading end at a short distance, one to five inches, outward of the right-hand end of the tube as seen in FIG. 2. A sensor (not shown) which can be a micro-switch, a photocell device, or the like, is actuated by the leading end and operates to energize a cutoff device, presently to be described, simultaneously to deactivate the infeed device. The given length of hose is thus measured and cut off so that the respective ends of the hose extend outwardly of the ends of the split rigid tube assembly each by a small distance, that is, on the order of 1 to 5 inches.

Referring to FIG. 7, the infeed device is secured on the frame by a bracket affixed on the post 31 so as to position the roll 104 immediately below and tangent to the path 105 of the hose and aligned with the longitudinal centerline of a tube 60 in station I.

The roll 104 is corotatably mounted on the output shaft 105 of speed reducer 107, such as the Boston Gear Company's catalog No. SF 318, including a clutch-brake 109 to control rotation of the roll. On a bracket 111 affixed to the frame a swing arm 113 carrying the cooperating grooved roll 106 is pivoted on a pin 115 so located that the rolls cooperate to pull hose from the supply 100 and push a leading end into the associated tube. The swing arm is biased by a tension spring 117 attached to and between the cap plate 31a of the post 31 and the swing arm so that the traction applied to the hose can be regulated. To facilitate the introduction of a fresh hose leading end into the apparatus, a funnel-shaped guide 119 is secured on the bracket and so located as to aid in introducing the end of the hose into space provided between the roll 104 and the roll 106.

Figure 9:
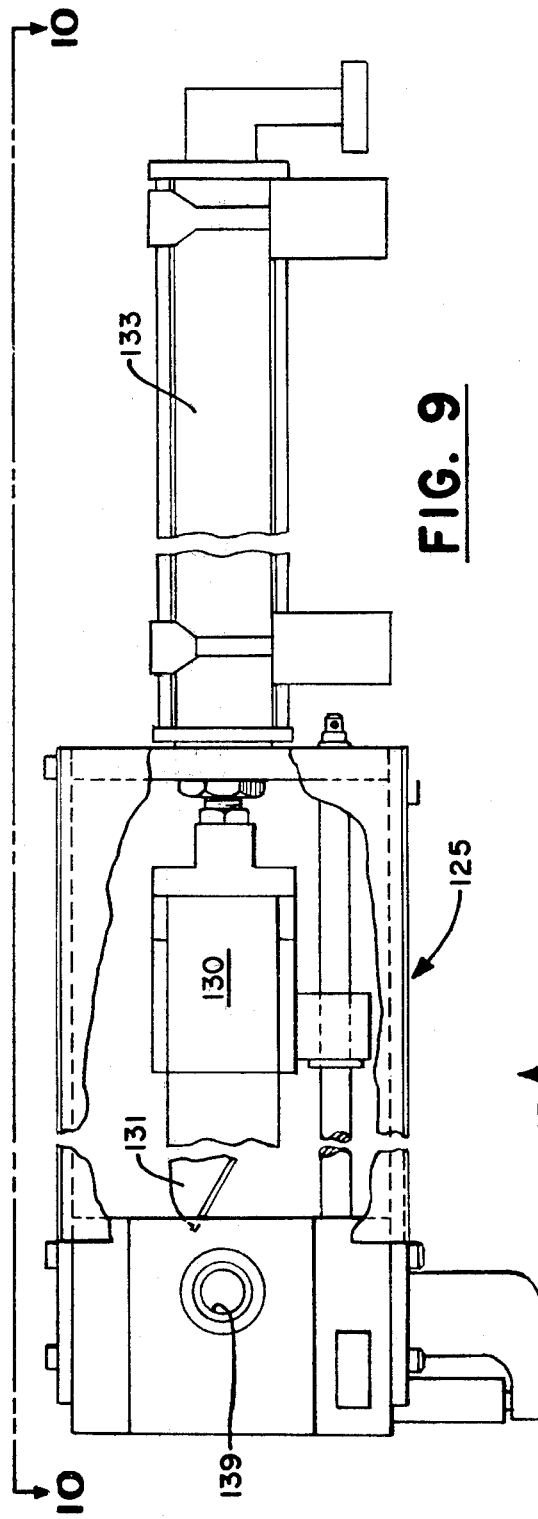
FIG. 9 is a view taken on the line 9—9 of FIG. 8.
Figure 10:
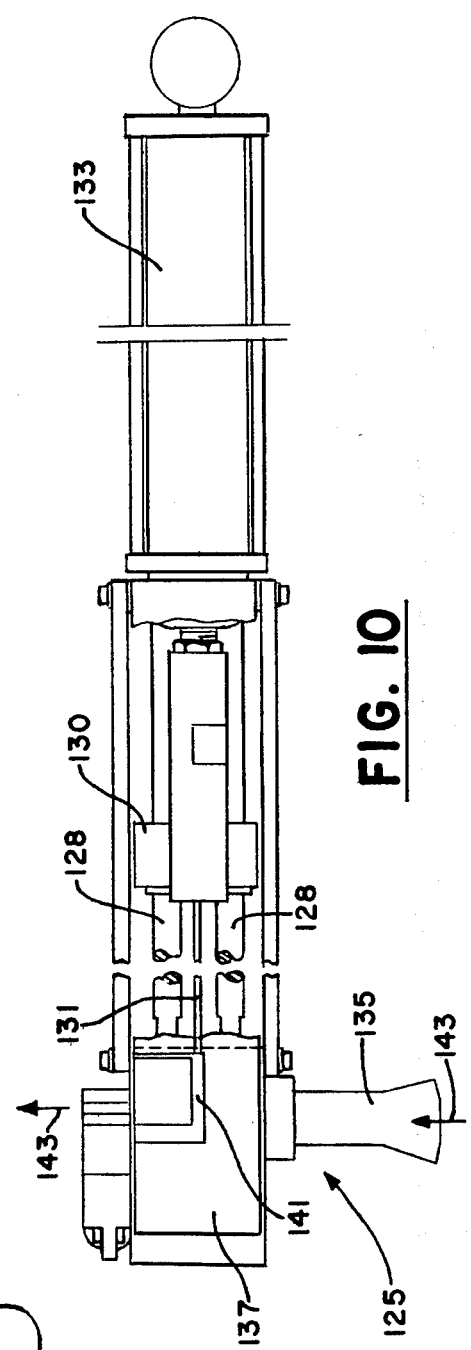
FIG. 10 is a view taken on the line 10—10 of FIG. 9.

Turning now to FIGS. 8, 9, and 10, the cutoff device 125 previously referred to, is mounted on the post 31 between the infeed device 102 just discussed and the end of the tube in Station I. The device comprises a frame 126 having a pair of guide rods 128 fixed therein and a cutter body 130 slidable on the guide rods and carrying a single blade 131 the cutting edge of which is inclined at approximately 60 degrees with respect to the guide rods. The blade body is driven by an air cylinder operator 133 to sever the given length of hose from a supply thereof by a single stroke. As seen in FIG. 10, the frame is provided with a guiding funnel 135 collinear with the tube 60 in Station I and with the traction space between the infeed rolls.

The guiding funnel 135 is secured to a block 137 forming a part of the frame 126 in which is a bore 139 at a diameter sufficient to support the hose to have free longitudinal movement therethrough. The block is provided with a slot 141, FIG. 10, in line with the blade 131 providing sufficient clearance to accommodate the stroke of the blade to cut the given length of hose from the incoming hose. From the slot outward in a direction of travel arrow 143 of the hose through the cutoff device, the block has a slot 145 formed laterally as seen in FIG. 8, outwardly to enable the hose to pass freely along an arcuate path 147 determined by the motion of the holding means on the rotor. Fixed on the block 137 to extend the support for the hose outwardly is a small pad 149 having a semi-cylindrical surface 149a coaxial with the bore and oriented as seen in FIG. 7 to permit the cut hose to be moved outwardly along the path 147. Because a running length of hose from a bulk supply retains a tendency to curl, a funnel-shaped surface 151 of semi-circular cross-section convergent toward the viewer of FIG. 8 is formed on a swing arm 153 pivoted about a pin 155 fixed in the block and is actuated by a small air-cylinder operator 157 connected to the arm and to a bracket 159 also affixed to the block. The funnel-shaped guide surface 151 of the arm is normally closed to opposition with the semi-cylindrical surface 149a of the pad to guide a leading end of the hose into the associated holding tube but it opened to the position shown in FIG. 8 to permit the given length, after cutoff, to be moved along the arcuate path 147 after which it is closed again.

The hose end couplings of which the present invention is concerned are well known commercial articles requiring no further description here. Suffice it to say that each coupling comprises: a ferrule the outside diameter of which conforms to the inside diameter of the hose, a threaded collar adapted to fit threadably on the hose bib of a faucet or the like has a hole which loosely receives the ferrule and is retained thereon by an external flange of the ferrule, and a sleeve with an inside diameter suited to the outside diameter of the hose. These articles are furnished at least partly of steel and are commonly plated with brass or otherwise finished for appearance. In any event, such couplings are at least partially responsive to magnetic forces.

To deliver the hose end couplings of the type referred to, the apparatus 20 has in association therewith a coupling storage feeder 150 which is a commercial unit supplied by Campbell Machines Company of Novi, Michigan. The feeder is disposed adjacent the apparatus as seen in FIGS. 1, 2, and 3, in such a way as to deliver hose end couplings, in a single line or queue with each of the couplings oriented so that the ferrule extends downwardly from the collar, to a center track 151 having a support member 152 and a pair of slide tracks 153 spaced to accommodate the outer sleeve while slidably supporting the collar of the coupling. The track terminates at a splitter assembly 155, FIG. 11, which divides the single queue by releasing individual couplings alternately to two gravity track assemblies 160,162 of similar construction by which the couplings are delivered serially to the respective coupling inserters disposed adjacent the respective ends of the rigid tube in Station II and described later herein.

Figure 11:
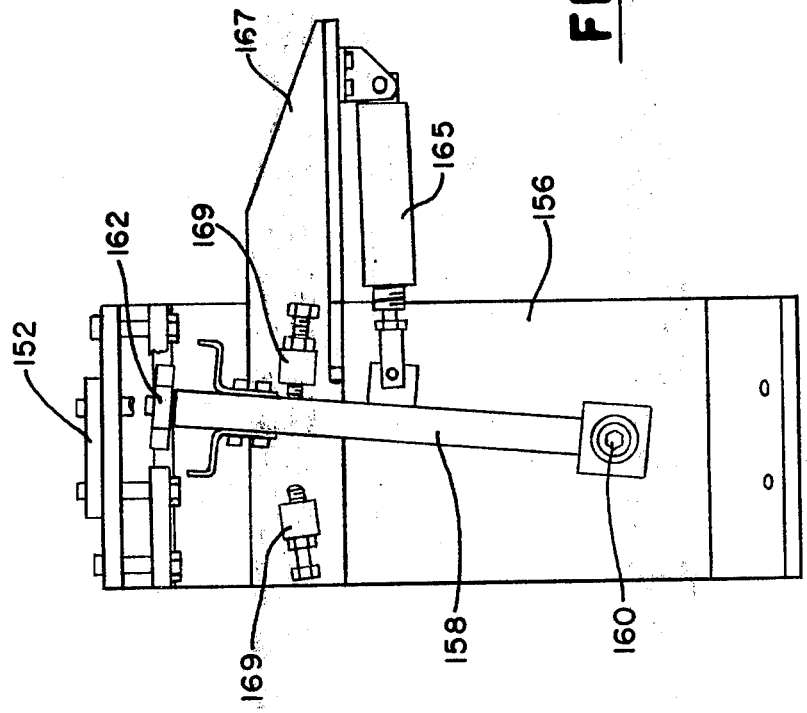
FIG. 11 is a view of another portion of the apparatus of FIGS. 1, 2, and 3 as seen on the line 11—11 in FIG. 3.

The splitter assembly 155, FIG. 11, includes a post 156 attached to the center post 42 of the apparatus and extended upwardly therefrom to secure the main member 152 of the track 151. Mounted on the post 156 is an oscillator arm 158 pivoting about a pin 160 fixed in the post and having at its oscillating end a selector block 162 configured to engage the ferrule or sleeve of a coupling in the track 151 and to move it to the left, FIG. 11, into the gravity track 162 seen at the right portion of FIG. 2. The oscillator arm then swings to move the block 162 to the left thereby opening the path of the next succeeding coupling to alignment with the other gravity track 160. The cycle is repeated at such a rate as to assure a constant supply of couplings in each of the two gravity tracks 160 162 leading to the respective coupling inserters. The arm 158 is oscillated by a small air-cylinder operator 165 fixed on a bracket 167 attached to the post 156 and connected to the intermediate portion of the arm so as to oscillate the arm between adjustably fixed stops 169 mounted on the post 156.

The respective gravity tracks 160,162, FIG. 2, are similar in construction to the track 151 previously mentioned in having respectively a main member 160a,162a and a spaced apart pair of guide members 160b,162b to maintain the couplings properly oriented and in a line. The main member 160a,162a terminates at and is connected to the respective coupling inserter so as to deliver successive couplings one at a time to the V-block of the coupling inserter.

Figure 12:
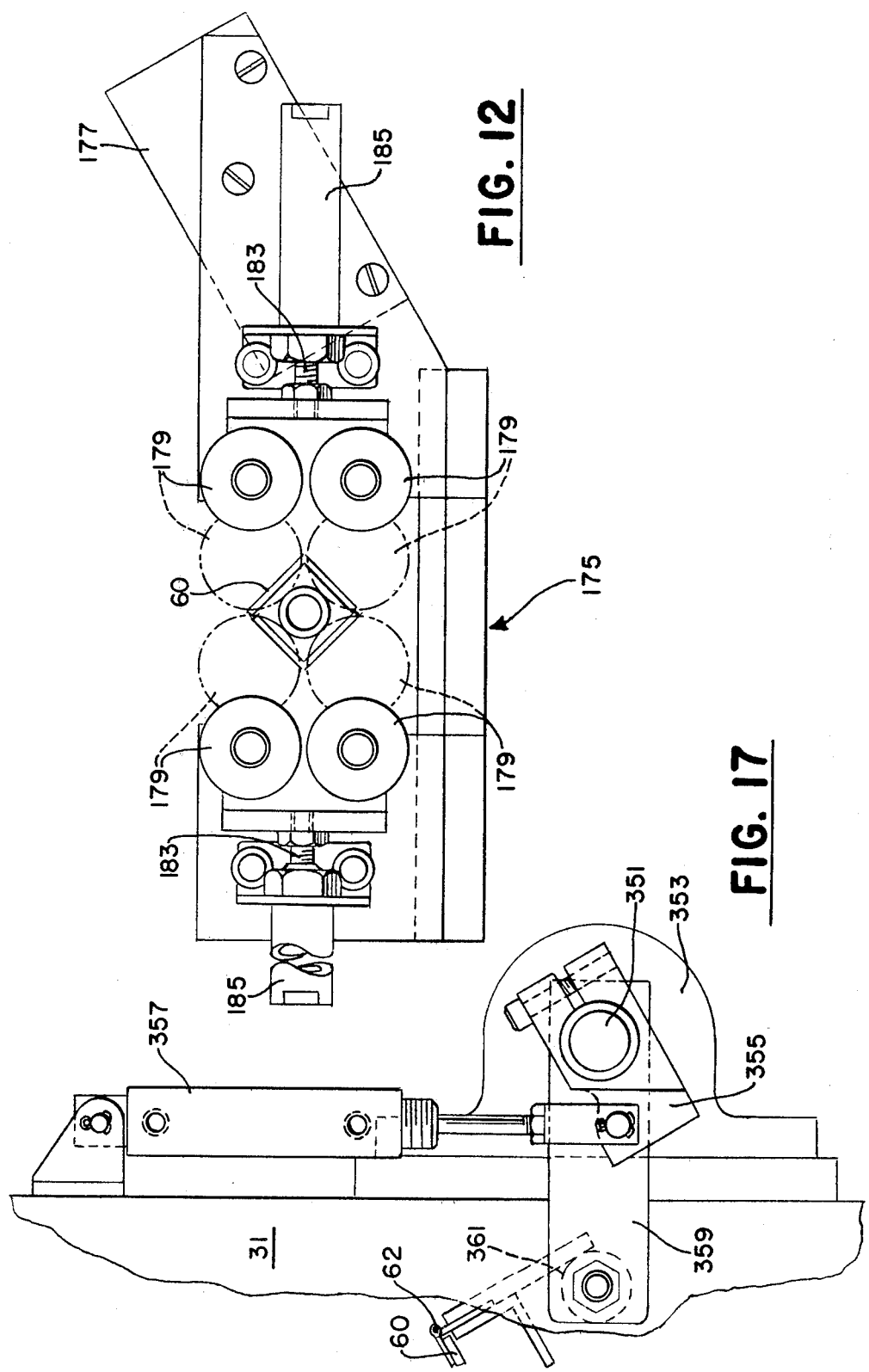
FIG. 12 is an elevation view of part of the apparatus as seen on line 12—12 of FIG. 2.
Figure 13:
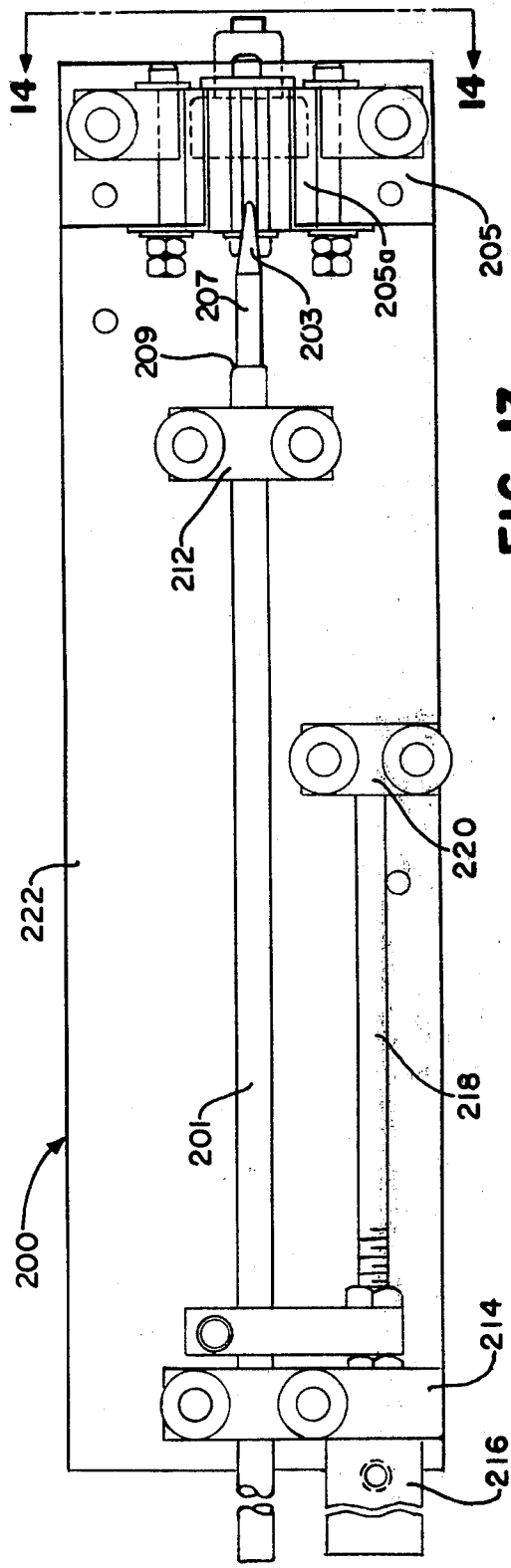
FIG. 13 is a plan view of a part of the apparatus of FIGS. 1, 2, and 3 taken on the line 13—13 in FIG. 2.

To position the respective hose ends in line with the length of the tube 60, to overcome tendency to curl, the apparatus includes a pair of centering devices 175, best seen in FIG. 12, each comprising a bracket 177 fixed on one of the posts of the respective upper frame parts 45,50 to which the respective terminii, FIG. 13, of the gravity tracks 160,162 are attached. Each centering device includes two pairs of rollers 179 each pair of which is mounted rotatably on an angle bracket 181 which angle bracket is attached to the operating rod 183 of an air-cylinder operator 185. The cylinders can be operated to move the opposed pairs of rollers toward each other along a common direction line which intersects the centerline of the associated tube 60 in Station II. The stroke of the cylinder operators is so adjusted that the two pairs of rollers gently engage and locate the respective hose end.

Figure 14:
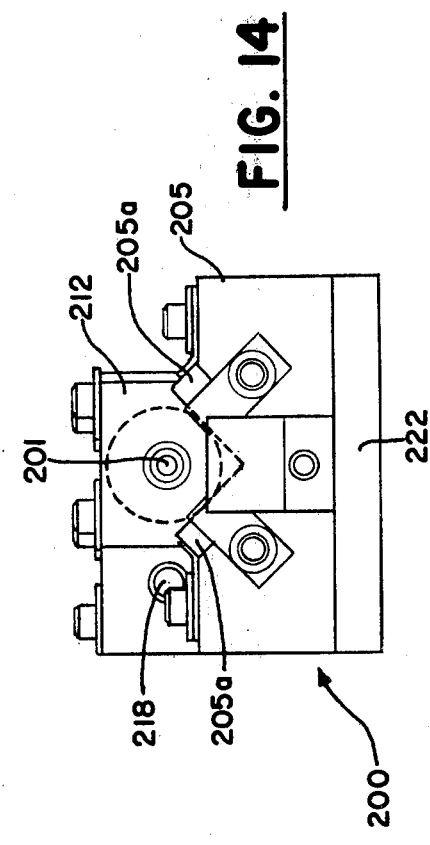
FIG. 14 is a view of the part of FIG. 13 taken as shown by the line 13—13 in FIG. 13.

To insert a hose end coupling in each end of the given length of hose held in the rigid tube in Station II, the hose ends being located by the centering means, the apparatus includes a pair of coupling inserters 200, FIGS. 13 and 14; the two inserters are identical and are disposed oppositely on the respective parts 45 and 50; each inserter includes an inserter pin 201 collinear with the other and with the rigid tube 60 in Station II. The pin 201 is provided with a tapering end 203 first to enter the coupling held in the V-block 205 and then to enter the associated end of the hose. From the tapering end a reduced diameter portion 207 extends rearwardly to form a shoulder 209 which is engageable with the flange of the coupling ferrule to move the coupling into the hose end. The inserter pin 201 is slidable in a front 212 and a rear guide block 214 to maintain its alignment. The rear guide block supports an air-cylinder operator 216 and an extended piston rod 218 parallel to the inserter pin and slidable in a third guide block 220. The guide blocks are mounted on a base plate 222 which in turn is fixed on a triangular cap plate 224, as seen in FIG. 1 of the associated upper frame part. The previously mentioned V-block 205 is also fixed on the plate 222 to support a hose end coupling in coaxial alignment with the inserter pin. The V-block is provided with magnetic cheek pieces 205a which operate to hold the coupling in symmetrical alignment with the inserter pin until the coupling is engaged by the shoulder 209 to move into the associated hose end.

Preferably, the stroke of the cylinder operator 216 is such that while inserting the coupling in the associated end of the hose, the coupling is compelled to overtravel sufficiently to compress the hose longitudinally, thus to insure that the coupling is entered fully into the hose end. It will be remembered that couplings are simultaneously inserted into each end and thus the compression of the hose occurs longitudinally without buckling even though the tube does not grip the hose. The inserter pin 201 is then withdrawn leaving the couplings retained in the hose end and permitting the next coupling to drop into position in the V-block ready for the next insertion step.

To crimp the couplings which have been inserted into the respective ends of the length of hose, the apparatus 20 includes a pair of crimping devices 250 in collinear alignment with each other and with the rigid tube in Station III.

The terms "crimp", "crimper", and "crimping", used in the present specification for brevity, will be understood to mean the entire operation of securing a coupling to the respectively associated hose end which operation includes expanding the ferrule within the hose end and simultaneously collapsing the sleeve inward so as to grip the wall of the hose adjacent the end between the expanded ferrule and the collapsed sleeve.

The crimping mechanism in the present apparatus is a commercial device available from the Century Brass Company of Waterbury, Conn., and sold as a KXV (trademark) expander. The devices each include a head 251 in which is housed the mechanism for expanding the segments which enter the ferrule to expand the same and the plurality of segments which contract or close to squeeze the sleeve radially inwardly. The device includes a toggle linkage which provides the force actuating the expanding and the closing segments and a cylinder operator 256 mounted on a stand 253. The rod or ram of the operator is connected to the toggle linkage 254 and operated to expand and close respectively the segments mentioned. The device conventionally includes a lifting bracket 256, which in the present apparatus is provided with a lug 257 for connection to a connecting rod presently to be described.

Each crimping mechanism is mounted on a track assembly. The respective track assemblies 260,262 are fixed respectively on the upper frame parts, one at the right hand and the other at the left hand, as seen in FIG. 2. The crimping mechanism 250 is movable on the tracks in collinear alignment with a rigid tube 60 in Station III between an operating position and a rest position remote from the respectively associated end of the tube.

In the present apparatus the respective crimping mechanisms are moved toward one another to an operating position wherein the respectively associated end coupling is not only crimped but wherein prior to actuation of the crimping mechanism the hose is longitudinally compressed sufficiently to insure that the coupling is fully positioned on the hose end in full engagement with the ferrule and with the sleeve.

To move the crimping machines of Station III toward one another to crimp the respective hose couplings to the given length of hose in the tube, the apparatus includes a crank assembly 300, FIGS. 15 and 16, which is mounted on the center post 42. The assembly includes a crank shaft 302 whose axis of rotation extends perpendicularly of the common axis 85 and which is supported on a pair of pillow block bearings 304 on a base plate 306 attached to the center post. Also mounted on the base plate is a motordriven gear reducer 308 the output shaft of which extends parallel to the crank shaft and carries a sprocket 316 having a driven chain 312 drivingly looped about a sprocket 314 corotatably fixed on the crank shaft. The crank shaft has two throws 315,317 spaced 180 degrees apart. A connecting rod 321 having one end mounted on the crank throw 317 is connected to the crimping device 250 on the left in FIG. 2 so that one-half rotation (180°) can move the crimping device along its track between its rest position and an operative position to crimp a coupling inserted in the associated hose end.

The other crank shaft throw 315 carries a connecting rod 324, which is adjustable in length, presently to be discussed more fully, the other end of which is similarly connected to the crimping device 250 seen on the right of the apparatus shown in FIG. 2 so that the latter crimping is moved from its rest position to an operative position for crimping a hose coupling inserted in the end of the hose in Station III.

The crank assembly 300 as described is thus operable to move the two crimping devices 250 from their respective rest positions to their respective operating positions. In addition, it has been found advantageous to make the respective connecting rods 321,324 adjustable so that before the crimping mechanism is actuated the length of hose in the holding tube is compressed longitudinally sufficiently to insure that the couplings are fully seated in the respective ends of the hose.

Since occasionally couplings may be supplied in which the ferrule of the coupling may not be of its normally expected cylindrical form, to correct such ferrules each of the coupling inserters can be provided with an additional pin (not shown) extending parallel to and spaced upwardly of the inserter pin a distance corresponding to the center-to-center spacing of the couplings in the respective gravity tracks 160, 162. Thus upon advancing the inserter pin 201 to move one coupling into the associated end of the hose, the additional pin (not shown) is caused simultaneously to enter the next succeeding coupling in the gravity track and thereby reform the ferrule to proper cylindrical state. The reforming pin is then withdrawn together with the inserter pin ready to repeat the operation.

To open the tubes 60 to release or eject the hose unit from the holding tube in Station V, the apparatus, FIG. 2, includes an ejection means provided by a shaft 351 rotatably mounted in pillow block bearings 353 respectively attached on the right 31 and left 32 posts. The shaft carries an operating crank arm 355 which is connected to the piston of an air cylinder operator 357 mounted on the left post 31 to rotate the shaft as seen in FIG. 17. The shaft has corotatably fixed thereon a plurality of roller lever arms 359 the rollers 361 of which respectively engage the tabs 82 which are fixed on the hinged wall member 60b of the tube in Station V. Thus, rotation of the shaft causes the rigid tube to open along its entire length to release the completed hose assembly therein in a direction normal to its own length. The hose unit drops freely to the deflecting plate 365 extending between and fixed to the post whence it is dropped into a shipping box or other container.

A further feature of the apparatus is the provision of readily changing the length of hose units to be assembled, for example from 60-inch overall length of hose units in the arrangement illustrated in the drawings to 48-inch overall length or to another specified overall length as may be required by the market. Mention has been made earlier herein of the adjustment of the upper frame part 50 in position longitudinally of the base. It has been noted also that one inserter 200, one centering device 175, and the crimping device track 262 are each fixed on the upper frame part 50 seen in FIG. 2. Therefore, the upper frame part and the operating mechanisms can be moved as a unit toward the left or toward the right as seen in FIG. 2. The gravity track 162 shown can be replaced completely or in part as indicated in the phantom outline in FIG. 2. For this purpose the end of the gravity track is removably attached to the splitter assembly 155 (either by a hinge or by a quick disconnect pin arrangement of any convenient type) and suitably attached to the V-block in any convenient manner as seen in FIG. 11.

The connecting rod 324 which is attached to the crimping device, being formed of a telescoping rod 324a in a hollow tube 324b can be changed in length by removing the locking pin 324c and reinserting after the change of length of the connecting rod is made to suit the new position of the frame part 50.

It has been mentioned also that the rigid tubes are mounted on the rotor in a manner to facilitate their removal and interchange. FIG. 4 illustrates a minimum length holding tube 60' above the center shaft 86 and a maximum length tube 60 attached to the rotor 40 below the center shaft.

The procedure thus entails removing the pin 324c from the connecting rod, releasing the gravity track 162, and moving the upper frame part 50 to suit the length of the selected holding tubes. The plurality of holding tubes are removed from the rotor and replaced by a plurality of tubes of the desired overall length in the manner previously described. With the upper frame part and the crimping device suitably located, the locking pin is replaced in the connecting rod and the selected gravity track or part thereof is secured in position suited to the selected length of hose unit.

The apparatus features step-by-step indexing of the respective tubes successively to each of the stations. The indexing is actuated by means of entirely conventional electric and pneumatic circuitry readily apparent to persons skilled in the art. Notably, each of the steps described herein occurs in the time interval during which the leading end of the hose is inserted in the holding tube in the first station, I, measured and cut off. Thus each rotation of the rotor stepwise delivers a completed hose unit from Station V.

According to a further aspect the method of assembling a hose unit comprises measuring and cutting off a given length of hose from a supply thereof, placing the given length of hose in a rigid tube of a length only slightly less than said given length and of transverse inside dimensions at least sufficiently greater than the transverse outside dimensions of the hose to permit the hose to move freely longitudinally of the tube and simultaneously inserting couplings one into each end of the given length of hose while the latter occupies the rigid tube.

The method contemplated will be seen by persons skilled in the art to conform to the steps of the operation of the apparatus which has been described. After the insertion of the respective couplings into the given length of hose, the pair of couplings are then crimped to secure them permanently to the respective ends of the length of hose while the hose occupies the holding tube. It should be remembered that it is found advantageous to compress the hose longitudinally both during the insertion of the respective couplings and during the crimping operation immediately prior to the expansion of the ferrule and the squeezing of the sleeve thereof.

The method further includes the release of the completed hose unit from the tube by opening the tube along its entire length the time of the operation thereby being further reduced as contrasted to that required to remove the hose lengthwise from such tube.

In the light of the foregoing disclosure persons skilled in the art will appreciate the simplicity of the present invention. The very simplicity of the invention yields certain notable advantages over the methods and apparatus previously employed to attach hose couplings to the ends of a hose.

Since both the couplings and hose of the type contemplated within the scope of the present invention tend to vary in diameter by small but tolerable amounts, there is inevitably a variation in the force required to insert the coupling end ferrule into the bore of the hose. At one extreme, the coupling may enter into the end of the hose freely without any force being required. At the other extreme, the diameters of the ferrule and of the inside of the hose may be such as to produce an interference fit and thus require considerable force to insert the coupling. It is a particular advantage, therefore, of the present method and apparatus that the two couplings be inserted simultaneously into the respective ends of the given length of hose while that given length occupies the holding tube. As has been mentioned, a small amount of over-travel in the insertion, as well as in the crimping operation, insures that the couplings are fully seated in the respective ends of the hose. This is accomplished without the need for clamping or grasping the hose and allows some longitudinal compression of the hose without causing it to buckle or bend transversely to any appreciable degree. We have found that simply by holding the hose loosely in the holding tube and by inserting the couplings simultaneously in the respective ends, any need for grasping of the hose is eliminated. The loosely fitting holding tube suffices to prevent buckling of the hose to an extent sufficient to permit the simultaneous insertion of a coupling in each of the two hose ends.

In addition, by feeding the hose longitudinally into the holding tube, the apparatus is considerably simplified. By positioning the hose without clamping in a loose-fitting tube movable to successive locations not only can the insertion of the couplings be simultaneously effected but likewise the necessary crimping of the couplings to the hose ends can be carried out simultaneously at the respective ends of the given length of hose and, moreover, be carried out concurrently with the insertion and cutoff of a next length of hose thereby providing improved productivity with respect to the prior art methods and apparatus.

Because the several operations taken place concurrently, the amount of in-process inventory is materially reduced in contrast to the usual methods and apparatus of the prior art wherein the several necessary steps of the process are each required to be supplied with only partially completed hose units awaiting their turn in the next step of the process.

While certain representative embodiments and details have been shown for the purpose of illustrating the invention, it will be apparent to those skilled in the art that various changes and modifications may be made therein without departing from the spirit or scope of the invention.

What is claimed is:

1. A method of assembling a hose unit composed of a given length of hose and a pair of hose couplings one at each end of the length of hose, the method comprising measuring and cutting off said given length from a supply of hose, placing said given length of hose in a rigid tube of a length only slightly less than said given length and of transverse inside dimensions at least sufficiently greater than the transverse outside dimensions of the hose to permit the hose to move freely longitudinally of said tube, and simultaneously inserting said couplings one into each end of the given length of hose while the latter occupies said rigid tube.

2. A method as claimed in claim 1, and further comprising feeding the leading end from said supply freely longitudinally through said tube to a predetermined location, and cutting off said given length from said supply while said given length occupies said tube.

3. A method as claimed in claim 1, comprising the further step of simultaneously crimping said pair of couplings to secure said couplings permanently to the respective ends of said given length while said given length of hose occupies said tube.

4. A method as claimed in claim 1, 2, or 3, further including releasing said hose unit from said tube by opening said tube along its entire length to release said hose unit in a direction normal to its own length.

5. A method as claimed in claim 1, 2, or 3, further comprising delivering said pair of couplings by gravity slide means from a single queue of said couplings to positions respectively adjacent each said end.

6. A method as claimed in claim 1, 2, or 3, additionally comprising moving said tube step by step in a direction perpendicular to its own length, feeding the leading end of hose from a supply thereof into said tube at a first step, simultaneously inserting said couplings one in each end of said given length at a second step, and releasing said hose unit from said tube by opening said tube along its entire length at a third step.

7. A method as claimed in claim 6, comprising further moving said tube about an axis parallel to its own length.

8. A method as claimed in claim 1, 2, or 3, wherein said given length of hose whole occupying said tube is essentially straight.

9. A method as claimed in claim 1, 2, or 3, comprising further compressing said given length of hose longitudinally while said length occupies said rigid tube by urging said couplings simultaneously toward the ends of said given length positively to position said couplings relative to said ends.

10. An apparatus for assembling a hose unit composed of a given length of hose and a pair of hose end couplings one at each end of the length of hose, the apparatus comprising holding means for supporting said given length of hose without longitudinal restraint thereof, moving means for moving said holding means stepwise to a plurality of successive stations, infeed means for feeding said given length of hose longitudinally into said holding means, a pair of inserter means cooperable simultaneously to insert a hose end coupling in each end of said given length of hose in said holding means, and support means including a frame constructed and arranged to support in cooperable relation said holding means, said moving means, said infeed means, and said pair of inserter means.

11. Apparartus as claimed in claim 10, said holding means comprising tube means providing a pair of tube-wall members separable to release said hose unit in a direction normal to said given length, said tube means having transverse dimensions sufficiently greater than the corresponding transverse dimensions of said hose to permit said given length to be inserted freely longitudinally in the tube means but not greater than the corresponding transverse dimensions of said hose required to minimize transverse bending of said hose when said couplings are being inserted therein.

12. Apparatus as claimed in claim 10, said moving means including rotor means carrying a plurality of said holding means for rotation about a commmon axis.

13. Apparatus as claimed in claim 10 or 11, further comprising a plurality of said holding means each including a pair of tube-wall members each shorter by from 2 to 10 inches than said given length.

14. Apparatus as claimed in claim 10, further comprising a pair of crimping means mounted on said support means and cooperable simultaneously to engage and to secure a hose end coupling to each end of said given length after said couplings have been inserted by said inserter means.

15. Apparatus as claimed in claim 10 or 11, further comprising ejector means mounted on said support means and operable at one of said stations to eject a completed hose unit from said holding means disposed in such station.

16. Apparatus as claimed in claim 10, 11, or 14, said frame including a base, a first and a second upper frame part, said moving means including rotor means carried by said lower frame and carrying a plurality of said holding means for rotation about a common axis, said infeed means being fixed on the lower frame, said inserter means being fixed respectively on said first and said second upper frame, each inserter means having rod means movable toward and away from each other and said holding means along a line parallel to said common axis at one of said stations.

17. Apparatus as claimed in claim 16, said second upper frame part being mounted on said lower frame for movement toward or away from said first upper frame part to accommodate changes of the holding means carried by said rotor means for use in assembling hose units having a length other than said given length.

18. Apparatus as claimed in claim 10, further comprising coupling delivery means associated with said support means for delivering couplings to each inserter means at one of said stations.

19. Apparatus as claimed in claim 18, said coupling delivery means including track means for maintaining a single queue of couplings, a pair of gravity tracks, and splitter means for diverting a pair of couplings respectively to each of said gravity tracks.

20. Apparatus as claimed in claim 10, each said inserter means including V-block means disposed adjacent the respectively associated ends of said holding means at one of said stations.

21. Apparatus as claimed in claim 10, further comprising a pair of centering means disposed on said support means and operable to position respectively the ends of said given length of hose transversely thereof relative to the associated inserter means.

22. Apparatus as claimed in claim 10, comprising hose cutoff means on said support means disposed between said infeed means and said holding means in one of said stations and operable to cut said given length of hose from a running length supply of said hose.

23. Apparatus as claimed in claim 22, said cutoff means including guide means for guiding hose longitudinally therethrough in a first direction and slot means defining an opening through which said given length of hose is freely movable in a direction perpendicular to the said first direction.

24. Apparatus as claimed in claim 12, said moving means including index means on said support means drivingly connected to said rotor means to position each said holding means successively stepwise to each of said stations.

25. Apparatus as claimed in claim 10, said infeed means including a driving roll having a circumferential groove and an idler roll having a circumferential groove coplanar with the first-mentioned groove, said idler roll being spring-biased toward said driving roll.

26. Apparatus as claimed in claim 20, each said inserter comprising an elongated rod having a tapered end and a reduced diameter portion defining a shoulder on said rod, said rod being movable longitudinally of itself to pass through a coupling in said V-block to locate said shoulder in said coupling and to carry said coupling into the respectively associated end of said given length of hose.

27. Apparatus as claimed in claim 12, each said holding means and said rotor means having interlocking means cooperable to allow manual exchange of holding means adapted for different lengths of hose units.

28. Apparatus as claimed in claim 15, each said holding means including a pair of tube-wall members separable one from the other, spring means operable to bias one wall member toward the other member, said ejector means including lever means operable to move one said wall member apart from the other said wall member to release a complete hose unit from said holding means.

29. Apparatus as claimed in claim 14, further comprising crank means on said support means including a crank shaft having two throws spaced 180 degrees apart, a connecting rod associated respectively with each of said throws, and each connecting rod connecting respectively to one of said crimping means for moving said crimping means simultaneously toward holding means located therebetween in one of said stations in response to rotation of said crank shaft.

30. Apparatus as claimed in claim 29, one said connecting rod having means for adjusting the length thereof to accommodate diverse lengths of said holding means.

* * * * *